(12) United States Patent
Lindgren et al.

(10) Patent No.: US 8,185,094 B2
(45) Date of Patent: May 22, 2012

(54) MESSAGE HANDLING IN AN IP MULTIMEDIA SUBSYSTEM

(75) Inventors: Anders Lindgren, Älvsjö (SE); Anders Danne, Kista (SE); Christer Boberg, Tungelsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1140 days.

(21) Appl. No.: 11/918,959

(22) PCT Filed: Dec. 21, 2005

(86) PCT No.: PCT/EP2005/057067

§ 371 (c)(1),
(2), (4) Date: Oct. 22, 2007

(87) PCT Pub. No.: WO2006/114135

PCT Pub. Date: Nov. 2, 2006

(65) Prior Publication Data

US 2009/0023399 A1    Jan. 22, 2009

(30) Foreign Application Priority Data

Apr. 28, 2005 (SE) ...................................... 0500970

(51) Int. Cl.
*H04M 11/00* (2006.01)
*H04L 1/00* (2006.01)
(52) U.S. Cl. ..................... 455/412.1; 370/230
(58) Field of Classification Search .................. 455/88, 455/411, 435.1, 417, 418, 550.1, 557, 412.1, 455/412.2, 414.1; 379/355.03, 311.01, 211.02, 379/142.12; 370/229, 230
See application file for complete search history.

(56) References Cited

U.S. PATENT DOCUMENTS

| 7,149,522 | B2 * | 12/2006 | Koskelainen | ............... 455/435.1 |
| 2004/0230659 | A1 | 11/2004 | Chase | |
| 2004/0259532 | A1 * | 12/2004 | Isomaki et al. | ............ 455/412.1 |

OTHER PUBLICATIONS

PCT International Search Report mailed Feb. 27, 2006.
Notification of Transmittal of International Preliminary Report on Patentability mailed Jul. 26, 2007.
European Telecommunications Standards Institute: "Telecommunications and Internet Converged Services and Protocols for Advanced Networking (TISPAN); NGN Signalling Control Protocol; Completion of Communications to Busy Subscriber (CCBS) PSTN/ISDN Simulation Services," Technical Specification, Apr. 2005, pp. 1-35.
J. Rosenberg Cisco Systems H. Schulzrinne Columbia University R. Mahy et al.: "An invite Inititiated Dialog Event Package for the Session Initiation Protocol (SIP)" IETF Standard-Working-Draft, Internet Engineering Task Force, IETF, CH, vol. Sipping, No. 6, Apr. 12, 2005, pp. 1-39.

(Continued)

*Primary Examiner* — Blane J Jackson
(74) *Attorney, Agent, or Firm* — Nixon & Vanderhye P.C.

(57) ABSTRACT

A method of handling the delivery of push messages from a notification server of a Session Initiation Protocol based network to a network user. The method comprises signalling to said notification server the start of a Session Initiation Protocol session and the end of a Session Initiation Protocol session, and deferring the delivery of some or all push messages, scheduled for delivery to said user during the ongoing session, until the session has finished.

14 Claims, 3 Drawing Sheets

OTHER PUBLICATIONS

Tosi D.: "An advanced architecture for push services," Web Information Systems Engineering Workshops, 2003, Proceedings, Fourth International Conference on Rome, Italy Dec. 13, 2003, Piscataway, NJ, 2003, pp. 193-200.
H. Schulzrinne Columbia U.V. Gurbani Lucent P. Kyzivat J. Rosenberg Cisco: "RPID: Rich Presence Extensions to the Presence Information Data Format (PIDF)," IETF Standard-Working-Draft, Internet Engineering Task Force, IETF, CH, vol. simple, No. 4, Oct. 25, 2004, pp. 1-31.
3GPP TS 22.228 V6.8.0; 3rd Generation Partnership Project; Technical Specification Group Services and System Aspects; Serivce requirements for the Internet Protocol (IP) multimedia core network subsystem; Stage 1. (Release 6), Mar. 2005 (18 pages).
3GPP TS 23.218 V6.3.0; 3rd Generation Partnership Project; Technical Specification Group Core Network; IP Multimedia (IM) session handling; IM call model; Stage 2 (Release 6), Mar. 2005 (56 pages).
3GPP TS 23.228 V6.9.0; 3rd Generation Partnership Project; Technical Specification Group Services and System Aspects; IP Multimedia Subsystem (IMS); Stage 2 (Release 6), Mar. 2005 (179 pages).
3GPP TS 24.228 V5.12.0; 3rd Generation Partnership Project; Technical Specification Group Core Network; Signalling flows for the IP multimedia call control based on Session Initiation Protocol (SIP) and Session Description Protocol (SDP); Stage 3 (Release 5), Mar. 2005 (842 pages).
3GPP TS 24.229 V6.6.0; 3rd Generation Partnership Project; Technical Specification Group Core Network; IP Multimedia Call Control Protocol based on Session Initiation Protocol (SIP) and Session Description Protocol (SDP); Stage 3 (Release 6), Mar. 2005 (291 pages).
3GPP TS 29.228 V6.6.1; 3rd Generation Partnership Project; Technical Specification Group Core Network; IP Multimedia (IM) Subsystem Cx and Dx interfaces; Signalling flows and message contents; (Release 6), Apr. 2005 (57 pages).
3GPP TS 29.229 V6.4.0; 3rd Generation Partnership Project; Technical Specification Group Core Network; Cx and Dx interfaces based on the Diameter protocol; Protocol details; (Release 6), Mar. 2005 (27 pages).
3GPP TS 29.328 V6.5.0; 3rd Generation Partnership Project; Technical Specification Group Core Network; IP Multimedia (IM) Subsystem Sh interface; Signalling flows and message contents; (Release 6), Mar. 2005 (36 pages).
3GPP TS 29.329 V6.4.0; 3rd Generation Partnership Project; Technical Specification Group Core Network; Sh Interface based on the Diameter protocol; Protocol details; (Release 6), Mar. 2005 (17 pages).

* cited by examiner

US 8,185,094 B2

MESSAGE HANDLING IN AN IP MULTIMEDIA SUBSYSTEM

This application is the U.S. national phase of International Application No. PCT/EP2005/057067 filed 21 Dec. 2005 which designated the U.S. and claims priority to SE 0500970-9 filed 28 Apr. 2005, the entire contents of each of which are hereby incorporated by reference.

FIELD OF THE INVENTION

The present invention relates to Session Initiation Protocol message handling in an IP Multimedia Subsystem (IMS), and in particular, though not necessarily, to a method and apparatus for deferring the delivery of Session Initiation Protocol messages to ensure provision of an appropriate service level to IP Multimedia Subsystem users.

BACKGROUND OF THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a GPRS/PS access network. Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique URI from the S-CSCF that it shall use when it initiates a dialog. In 3GPP, when a SIP terminal performs a registration, the IMS authenticates the user, and allocates an S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). [For the terminating call the request will include the P-CSCF address and the UE address.]

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded. In the case that an IFC indicates that a SIP message received at the S-CSCF should be forwarded to a particular SIP AS, that AS is added into the message path. Once the SIP message is returned by the AS to the S-CSCF, it is forwarded on towards its final destination, or forwarded to another AS if this is indicated in the IFCs.

An example of a SIP AS is a notification server (NS). A notification server might be used, for example, to provide a presence service to IMS subscribers. A presence service allows subscribers to publish details of their current availability, location and contact addresses to other subscribers. A subscriber subscribes to a presence service by sending a SIP SUBSCRIBE method to its S-CSCF, with the S-CSCF forwarding the SUBSCRIBE method to the notification server based on the IFC settings. The notification server may direct new Subscribe Requests to other notification servers, e.g. when a notifiaction server acts as a subscribing proxy on behalf of a subscribing user. A subscriber publishes a change to his or her current presence information by sending a SIP PUBLISH method to the notification server via the S-CSCF. A notification server may apply a rate limitation to the sending of notifications, e.g. to allow all notification generated within a given time window to be sent as a single block of data.

SUMMARY OF THE INVENTION

A problem has been identified in the provisioning of push-type SIP services such as the notification service. In the event that a user is involved in an ongoing SIP session which requires a relatively high quality of service, e.g. a voice call, the sending of a push message from the network to that subscriber can disrupt the ongoing session to an unacceptable extent. This applies in particular to IMS services where subscribers are making use of relatively low bandwidth (radio) access networks, and/or where terminal processing capacity is limited.

According to a first aspect of the present invention there is provided a method of handling the delivery of push messages from a notification server of a Session Initiation Protocol based network to a network user, the method comprising:

signalling to said notification server the start of a Session Initiation Protocol session and the end of a Session Initiation Protocol session; and deferring the delivery of some or all push messages, scheduled for delivery to said user during the ongoing session, until the session has finished.

Embodiments of the present invention allow the sending of low priority traffic to be deferred during an ongoing session which has a higher priority.

The signalling of the start and end of a Session Initiation Protocol session may be triggered, for example, by receipt within the Session Initiation Protocol network of a SIP INVITE, BYE, or CANCEL message relating to the session.

The invention is applicable in particular to an IP Multimedia Subsytem (IMS) network.

In one embodiment of the invention applicable to the IMS case, said signalling step is facilitated by adding the notification server into the SIP signalling path, whereby SIP messages relating to the session are forwarded to the notification server by the Serving Call State Control Function (S-CSCF). This is facilitated by appropriately configuring the Initial Filter Criteria for said user.

In another embodiment of the invention also applicable to the IMS case, said signalling step is facilitated by signalling sent to the notification server from a session application server, e.g. a PoC application server. More particularly, said signalling is conveyed in SIP PUBLISH messages sent to the notification server by the session application server. In this case, the notification server is not added into the SIP path for the session related signalling.

The notification server may apply a prioritisation process to sessions of different types, deferring the sending of messages during certain session types but not during other session types. The notification server may also prioritise according to push message type or source, deferring certain messages but not others.

The invention is applicable in particular to deferring the sending of push messages during voice calls, e.g. during PoC sessions.

An example of a push type message which may be deferred is a presence service related message.

According to a second aspect of the present invention there is provided a notification server arranged to handle the delivery of push messages from a Session Initiation Protocol based network to a network user, the notification server comprising:

means for receiving notifications identifying the start of a Session Initiation Protocol session and the end of a Session Initiation Protocol session for said user; and means for deferring the delivery of some or all push messages scheduled for delivery to said user during the ongoing session, until the session has finished.

According to a third aspect of the present invention there is provided a Session Initiation Protocol application server comprising means for receiving session setup and termination related signalling in respect of a user for the purpose of authorising and controlling the session, and means for signalling to a notification server, responsible for sending push messages to the user, at least certain changes in the session status.

In a particular embodiment of the invention, the application server is a Push-to-talk over Cellular application server.

DETAILED DESCRIPTION OF CERTAIN EMBODIMENTS

Figure 1:
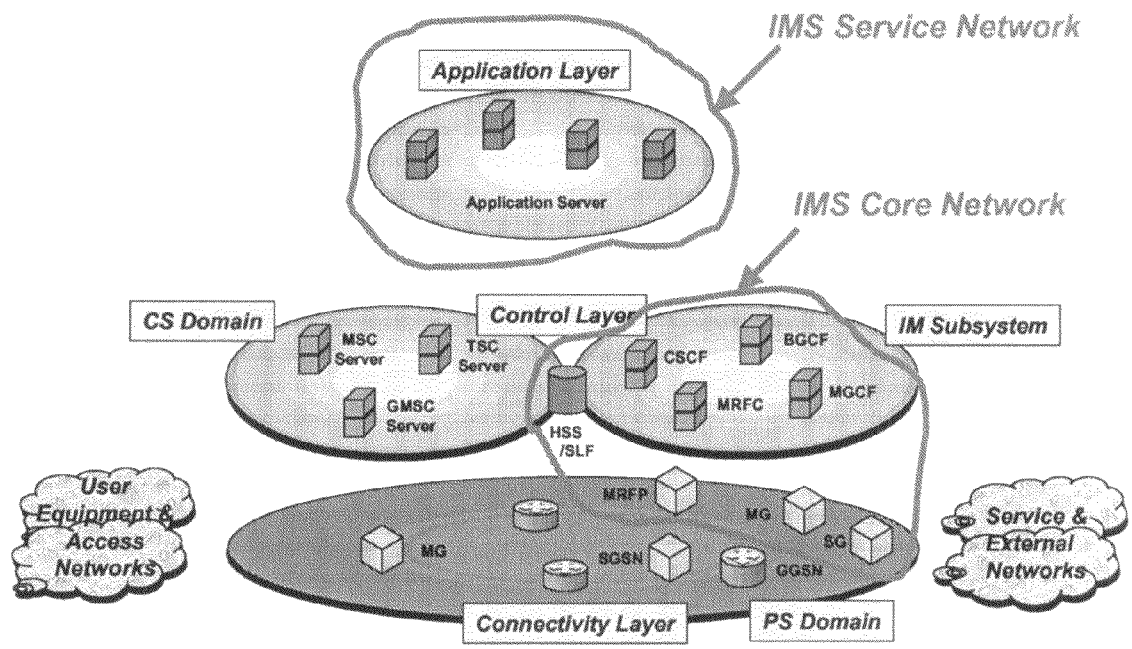
FIG. 1 illustrates schematically an IP Multimedia Subsystem core network within the context of a 3G network.

The provision of the IP Multimedia Subsystem (IMS) within a 3G network has already been described with reference to FIG. 1. In order to illustrate embodiments of the invention, reference will be made to the simplified schematic diagram of FIG. 2 which shows an IMS core network 1 comprising a Serving Call State Control Function (S-CSCF) node 2 and a notification server (NS) 3. For the purpose of this discussion, the NS 3 facilitates provision of a presence service to subscribers of the home network within which the S-CSCF and the NS are located. It will be appreciated that the NS will communicate with NSs of other networks (and possibly other NSs within the same home network) in order to provide a national or international presence service.

Figure 2:
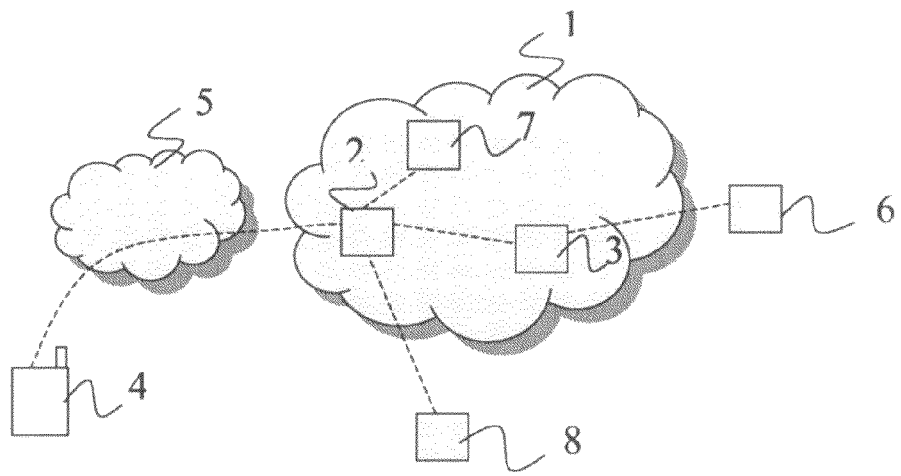
FIG. 2 illustrates schematically a number of entities involved in the provision of IP Multimedia Subsystem services to IP Multimedia Subsystem subscribers.

FIG. 2 illustrates a SIP enabled terminal 4 which communicates with the IMS via an access network 5. The NS 3 receives presence information from other notification servers 6, as well as from other subscribers (not shown) registered with the home network. In accordance with the defined standards, messages are routed via the S-CSCF(s). FIG. 2 also illustrates a second SIP application server 7. In this case, the SIP application server 7 is, by way of example, a Push-to-talk over Cellular (PoC) server arranged to facilitate subscriber access to the PoC service which is a walkie-talkie style voice call service. The S-CSCF 2 communicates with a Home Subscriber Server (HSS) 8 of the home network.

A first embodiment of the present invention will now be described with reference the signalling diagram of FIG. 3. A subscriber of the home network, designated "watcher" in FIG. 3, subscribes to the presence service facilitated by the NS. In a first signalling phase, the watcher instructs his client to add a particular peer user (here referred to as a "presentity") to his presence watching list using an "add buddy" instruction. This causes the watcher's client to send to the S-CSCF (within the IMS) a SIP SUBSCRIBE message containing the identity of the presentity, or the identity of the presence watcher list that includes the identity f the presentity. The S-CSCF will already have the IFCs for the watcher assuming that the watcher is already registered with the IMS. Alternatively, if the watcher is not already registered, the S-CSCF must authenticate and authorise the watcher via the Home Subscriber System, and obtain the IFCs from the HSS. One of the IFCs is set to cause the SUBSCRIBE message to be forwarded from the S-CSCF to the NS. The SUBSCRIBE message contains an expiry time, and up to that time the NS will forward to the watcher notifications whenever the (requested) information for the presentity changes.

When the watcher wishes to initiate a Voice-over-IP session with a peer user, in this example a PoC session, the watcher causes a SIP INVITE to be sent by his client to the IMS network. The S-CSCF receives the INVITE, and examines the IFCs for the watcher which were downloaded at registration of the watcher. In this example, one of the IFCs indicates that the INVITE should be forwarded to the NS. (As an alternative to using IFCs to trigger the sending of the INVITE to the NS, the S-CSCF can be configured to always send INVITEs to the NS.) The INVITE is received by the NS, and the initiation of a PoC session is logged in respect of the watcher. The INVITE is then returned to the S-CSCF, which examines the IFCs again and determines that the INVITE should be forwarded to the PoC application server for authorisation. Assuming that authorisation is given, the INVITE is returned to the S-CSCF which forwards it towards the called party.

The final phase of the signalling flow begins with an action on the part of the watcher to terminate the PoC session. This causes the watcher's client to send to the S-CSCF a SIP BYE. Again, the IFCs for the watcher indicate that the NS should be added in to the message path. Upon receipt of the BYE, the NS logs the PoC session as ended. Receipt of a SIP CANCEL message (e.g. generated by the PoC application server in response to a failed authorisation of the watcher) at the NS would have the same result.

In the interval between receipt of the INVITE and the BYE messages, the sending of notifications to the watcher is inhibited. For example, in the event that the NS receives a SIP PUBLISH message from the presentity or a SIP NOTIFY message from another NS forwarding presence information for some other presentity, the receiving NS will check whether any sending restrictions are currently in place for the watcher, and will determine that this is indeed the case. Any deferred notifications are retained at the NS, and are sent only after receipt of the BYE message.

It will be appreciated that the INVITE message may be received at the S-CSCF from some third party client, where the watcher is the called party. Receipt of this INVITE will cause the S-CSCF to examine the appropriate IFCs (for watcher as terminating party), and the INVITE to be forwarded to the NS. Similarly, the BYE message may originate with the remote client.

Figure 3:
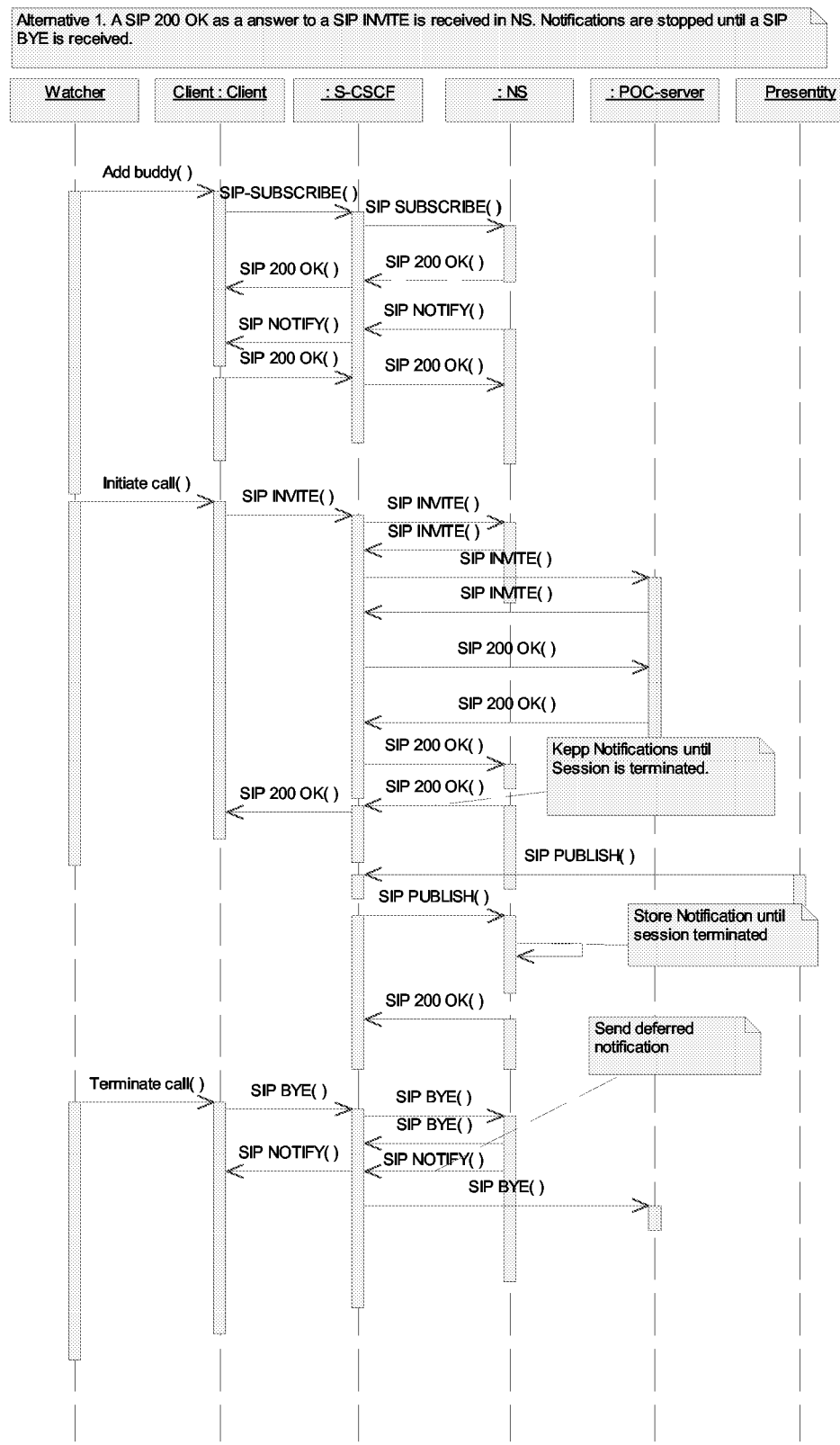
FIG. 3 is a signalling diagram illustrating a procedure for deferring delivery of push messages to IP Multimedia Subsystem subscribers according to a first embodiment of the invention.
Figure 4:
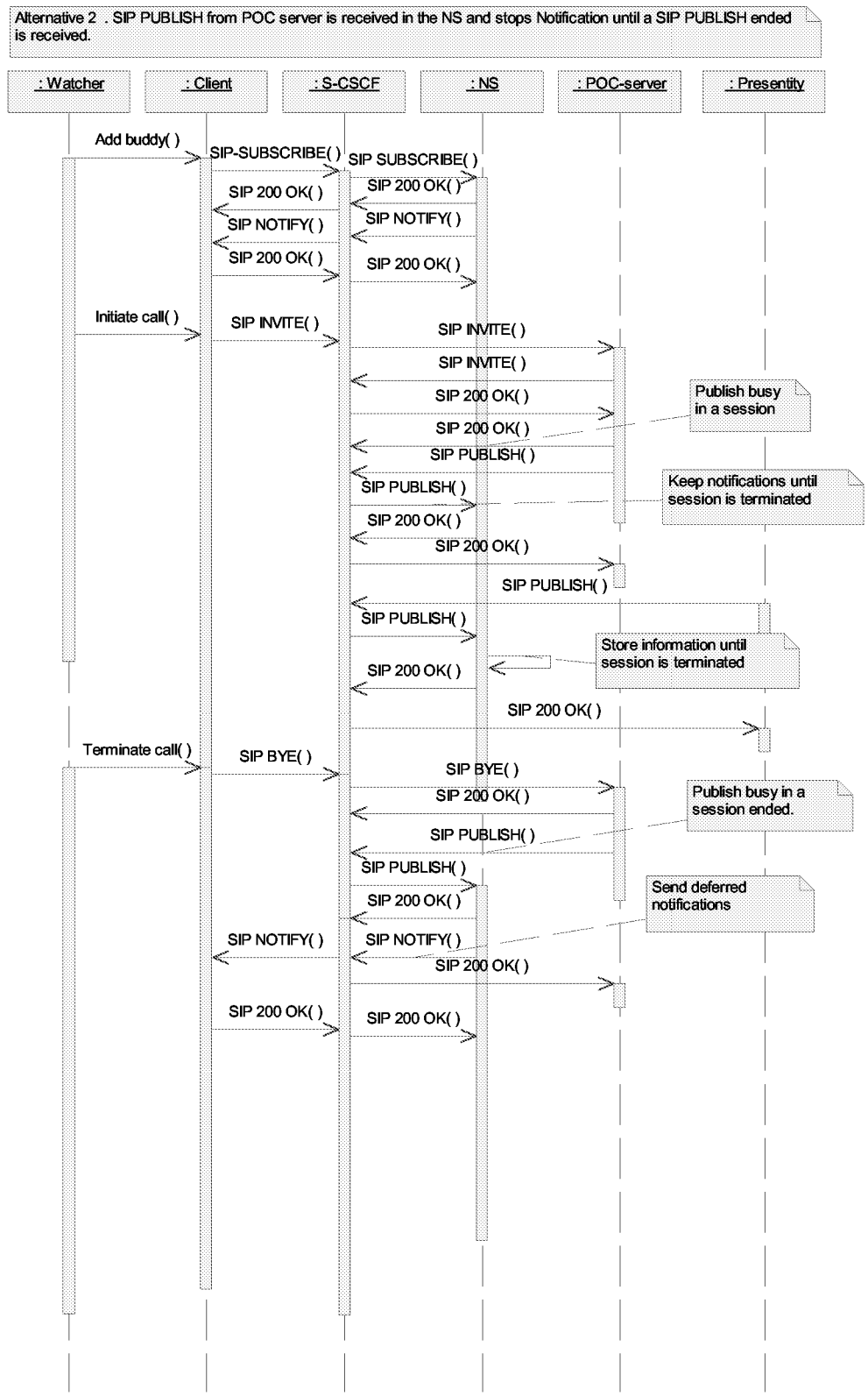
FIG. 4 is a signalling diagram illustrating a procedure for deferring delivery of push messages to IP Multimedia Subsystem subscribers according to a second embodiment of the invention.

FIG. 4 illustrates a signalling flow associated with an alternative embodiment of the invention. This embodiment addresses a disadvantage inherent to the embodiment described above with reference to FIG. 3, namely that the requirement to add the NS to the SIP message path introduces a delay in the end-to-end signalling process. The solution is to enable one or more application servers that have a knowledge of the session state to inform the notification server of this state. With reference to FIG. 4, in the case of a PoC service, the PoC application server will receive the initial SIP INVITE from the watcher (step 6). The PoC application server will handle this message in the normal way. In addition however, it will notify the NS via the S-CSCF of the change in status of the watcher by sending a SIP PUBLISH method to the NS (step 7). In the same way as described with reference to FIG. 3, thereafter, and until the NS receives from the PoC application server a PUBLISH method indicating that the PoC session for the watcher has ended, the NS will defer the sending of notifications to the watcher.

In either of the embodiments described above, the NS may apply a prioritisation scheme to handle different session types and different notifications. For example, this scheme may cause notifications to be sent during voice calls but not during video calls, the former being less bandwidth/processing intensive than the latter. The scheme may also, for example, prioritise notifications relating to the presence of users in dependence upon priorities applied to these users by the watcher: the watcher may wish to receive notifications in respect of a close relative during an ongoing session, but not in respect of work colleagues. In the case of the second embodiment (FIG. 4), prioritisation may also be carried out at the session server, e.g. the PoC server, in terms of which events should be notified to the NS.

It will be appreciated by the person of skill in the art that various modifications may be made to the above described embodiments without departing from the scope of the present invention.

The invention claimed is:

1. A method of handling the delivery of push messages from a notification server of a Session Initiation Protocol based network to a network user, the method comprising:
   signalling to said notification server the start of a Session Initiation Protocol session involving said user and the end of the Session Initiation Protocol session; and
   deferring the delivery of some or all push messages, scheduled for delivery to said user during the ongoing session, until the session has finished.

2. A method according to claim 1, the signalling of the start and end of a Session Initiation Protocol session being triggered by receipt within the Session Initiation Protocol network of a SIP INVITE, BYE, or CANCEL message relating to the session.

3. A method according to claim 1, wherein said Session Initiation Protocol based network is an IP Multimedia Subsytem (IMS) network.

4. A method according to claim 3, wherein said signalling step is facilitated by adding the notification server into the SIP signalling path, whereby SIP messages relating to the session are forwarded to the notification server by the Serving Call State Control Function (S-CSCF).

5. A method according to claim 4, wherein said notification server is added to the SIP signalling path by appropriately configuring the Initial Filter Criteria for said user.

6. A method according to claim 3, wherein said signalling step is facilitated by signalling sent to the notification server from a session application server.

7. A method according to claim 6, wherein said signalling is conveyed using the SIP PUBLISH method.

8. A method according to claim 3, wherein said session is a PoC session.

9. A method according to claim 1, wherein the notification server applies a prioritization process to sessions of different types, deferring the sending of messages during certain session types but not during other session types.

10. A method according to claim 1, wherein the notification server prioritizes the sending and deferring of push messages according to push message type or source.

11. A method according to claim 1, wherein said push messages are presence service related messages.

12. A notification server arranged to handle the delivery of push messages from a Session Initiation Protocol based network to a network user, the notification server comprising:
   means for receiving notifications identifying the start of a Session Initiation Protocol session and the end of a Session Initiation Protocol session for said user; and means for deferring the delivery of some or all push messages scheduled for delivery to said user during the ongoing session, until the session has finished.

13. A Session Initiation Protocol application server for authorising and controlling a Session Initiation Protocol session, comprising means for receiving session setup and termination related signalling in respect of a user, and means for signalling to a notification server, responsible for sending push messages to the user, at least certain changes in the session status, the signaling usable by the notification server for deferring the delivery of at least some push messages scheduled for delivery to said user during the ongoing session, until the session has finished.

14. An application server according to claim 13, the application server being a Push-to-talk over Cellular application server.

* * * * *

UNITED STATES PATENT AND TRADEMARK OFFICE
CERTIFICATE OF CORRECTION

PATENT NO. : 8,185,094 B2
APPLICATION NO. : 11/918959
DATED : May 22, 2012
INVENTOR(S) : Lindgren et al.

It is certified that error appears in the above-identified patent and that said Letters Patent is hereby corrected as shown below:

On the Title Page, item (56), under "OTHER PUBLICATIONS", in Column 2, Line 10, delete "Inititiated" and insert -- Initiated --, therefor.

On Page 2, item (56), under "OTHER PUBLICATIONS", in Column 1, Line 11, delete "Serivce" and insert -- Service --, therefor.

In Fig. 3, Sheet 2 of 3, delete "Kepp Notifications" and insert -- Keep Notifications --, therefor.

In Column 2, Line 55, delete "notifiaction" and insert -- notification --, therefor.

In Column 3, Line 27, delete "Subsytem" and insert -- Subsystem --, therefor.

In Column 6, Lines 36-37, in Claim 3, delete "Subsytem" and insert -- Subsystem --, therefor.

Signed and Sealed this
Twenty-third Day of October, 2012

David J. Kappos
*Director of the United States Patent and Trademark Office*